United States Patent

[11] 3,599,897

| [72] | Inventor | Elmer O. Wangerin<br>Rochester, N.Y. |
|---|---|---|
| [21] | Appl. No. | 883,662 |
| [22] | Filed | Dec. 22, 1969 |
| [45] | Patented | Aug. 17, 1971 |
| [73] | Assignee | Eastman Kodak Company<br>Rochester, N.Y.<br>Continuation of application Ser. No.<br>730,345, May 20, 1968, now abandoned. |

[54] FILM-THREADING SYSTEM
9 Claims, 3 Drawing Figs.

[52] U.S. Cl. ........................................... 242/208,
226/91, 242/192, 352/157
[51] Int. Cl. .......................................... B11b15/32,
G03b 1/04
[50] Field of Search ........................................ 242/192,
208, 74, 76; 226/91, 92; 352/157, 158; 274/4, 11

[56] References Cited
UNITED STATES PATENTS

| 3,006,650 | 10/1961 | Ellmore | 274/4 |
|---|---|---|---|
| 3,079,055 | 2/1963 | Chevallaz | 242/74 |
| 3,429,518 | 2/1969 | McKee | 242/186 |
| 3,467,340 | 9/1969 | Rosenburgh | 242/197 |
| 3,489,370 | 1/1970 | Mouissie | 242/198 |

*Primary Examiner*—Leonard D. Christian
*Attorneys*—Robert W. Hampton and G. Herman Childress ABSTRACT: An auxiliary film-threading device is incorporated in an automatic film-threading system of the type in which the leading end of a film strip is caused to separate from the film roll wound on a supply reel and to enter a guide channel by rotating the reel in an unwinding direction while successive portions of the reel are flexed toward each other into transverse squeezing engagement with the outer convolution of the film roll. In the event of failure of the automatic system to perform properly, a threading member of the auxiliary film-threading device is movable manually into peripheral contact with the rotating film roll to separate the leading end of the film from the reel and to direct it into the same guide channel.

PATENTED AUG 17 1971 3,599,897

ELMER O. WANGERIN
INVENTOR.

BY *H. Herman Childress*

*Robert W. Hampton*
ATTORNEYS

FILM-THREADING SYSTEM

This application is a continuation of Ser. No. 730,345 filed May 20, 1968 and now abandoned.

BACKGROUND OF THE INVENTION

Field of the Invention

The present invention relates to automatic film threading systems of the type disclosed in commonly assigned pending U.S. Pat. application Ser. No. 591,235, entitled "Strip Material Storage and Feed Arrangement," filed in the name of Norman J. Rosenburgh, on Nov. 1, 1966 now U.S. Pat. No. 3,467,340 and more particularly to the provision of such a system with an auxiliary film threading device adapted to be employed manually in the event of failure of the automatic system to perform in its intended manner.

Description of the Prior Art

In an automatic film-threading system of the type disclosed in the above-identified patent application, the leading end of a film strip wound onto a supply reel is caused to separate from the film roll and to enter a guide channel by flexing successive regions of the reel flanges toward one another as the reel is rotated in an unwinding direction, thereby transversely squeezing successive regions of the outermost convolutions on the film roll. Since the resilient film material resists being flexed or bowed simultaneously in two different directions, the leading end of the moving film strip is thus caused to move tangentially outwardly from the film roll and into contact with a generally cylindrical internal guide surface defined by a peripheral guide member substantially surrounding the roll, whereby the end of the film is directed into the previously mentioned guide channel.

Although the type of automatic threading system describes above is very reliable when used in conjunction with corresponding properly dimensioned film supply reels loaded with film of predetermined width in good condition, it may be incapable of performing properly if one or more of these criteria is lacking. For example, if the leading end of the film on the supply reel is split longitudinally, the transverse squeezing of the film will not necessarily effect the required separation of that portion of the film from the supply reel. Similarly, if the film is substantially narrower than the spacing between the reel flanges, or if only a small amount of film is wound onto the reel hub, the localized flexure of the flanges may be ineffective to produce the required transverse flexing of the leading end of the film. In the event of such occurrences, therefore, the end of the film strip must be separated from the roll and directed into the guide channel by manual means, which has heretofore involved removing the reel from the peripheral guide member to enable the operator to grasp the end of the film strip.

SUMMARY OF THE INVENTION

To eliminate the need for this bothersome and time-consuming procedure in the event of failure to perform properly of the automatic threading system including a flange or guide surface-engaging means for flexing the flanges together, the present invention provides an auxiliary threading device including a threading member which is manually movable from a remote position into peripheral contact with the two rotating film roll to guide the leading end of the film away from the roll and into the guide channel.

Various means for practicing the invention and other features and advantages thereof will be apparent from the following detailed description of a preferred embodiment thereof, reference being made to the accompanying drawings in which like reference numerals refer to like elements.

DESCRIPTION OF THE PREFERRED EMBODIMENT

Figure 1:
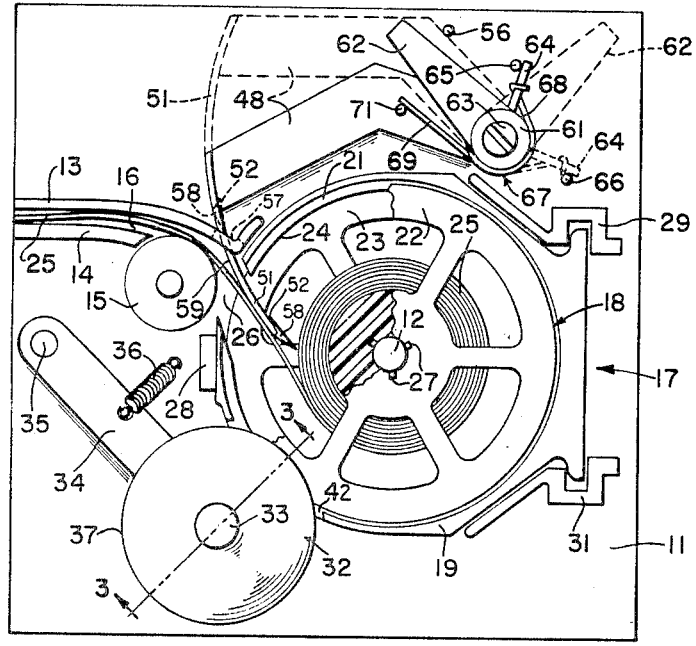
FIG. 1 is a partial top elevational view of a film-threading system incorporating an auxiliary film-threading device according to a preferred embodiment of the present invention.

The illustrative film-threading system is shown mounted on a partially depicted support plate 11 of a film-handling apparatus such as a film reader. Briefly, such a film reader or analogous apparatus comprises a film supply reel spindle 12 rotatably supported by the support plate 11 and a corresponding film takeup reel spindle, not shown, which is similarly mounted at the opposite end portion of the support plate 11. Toward the illustrated end of the support plate 11, a pair of film guide wall members 13 and 14 and a film guide roller member 15 cooperate to define a film guide channel 16. The end of the guide channel 16 opposite reel spindle 12 is aligned with a film gate, not shown, so that a strip of film fed along the guide channel 16 is directed into the gate. Beyond the film gate, a similar set of film guide members defines a corresponding second film guide channel by means of which the end of the strip of film emerging from the gate is guided into engagement within a self-threading film takeup reel mounted on the film takeup reel spindle.

A film supply magazine unit adapted to be installed on the reader device is identified by numeral 17 and is generally similar to the corresponding structure disclosed in the above-identified U.S. Pat. application. Such a magazine unit comprises a film reel 18 laterally enclosed by a magazine member 19 provided with an internal rib 21 projecting inwardly from and spaced between the edges of the respective upper and lower reel flanges 22 and 23. A cylindrical inner film guide surface 24 of this rib 21 laterally surrounds the roll a filmstrip 25 between the flanges 22 and 23 of the reel 18 except in the region of film throat 26, which extends through the magazine member 19 to define the only passage way through which filmstrip 25 can be withdrawn from the magazine 17.

When the magazine 17 is installed on the reader device, reel 18 is supported on spindle 12 and is engaged by splines 27 thereof so that rotation of the spindle 12 is imparted to the reel 18. Additionally, support lugs 28, 29, and 31 engage corresponding lateral and bottom surfaces of the magazine member 19 to maintain it in a predetermined position slightly above the support plate 11 and in concentric relation with the reel 18, with the magazine film throat 26 in alignment with the corresponding end of film guide channel 16.

Figure 3:
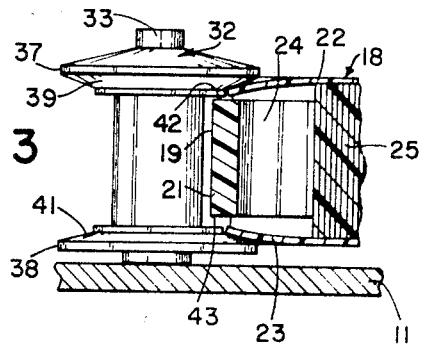
FIG. 3 is a partially cross-sectional view of a portion of the structure shown in FIG. 1, taken along the line 3–3 of that figure.
Figure 2:
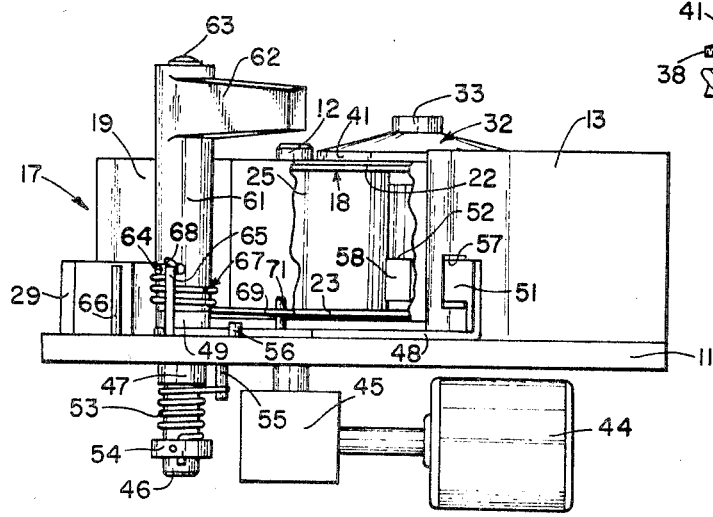
FIG. 2 is a front elevational view of the structure shown in FIG. 1 with a portion of the illustrated film magazine shown broken away.

Threading roller 32 is rotatably supported laterally adjacent the magazine 17 by shaft 33 carried by support bar 34, which is pivotally attached to the support plate 11 by pivot pin 35. A spring 36 biases the threading roller 32 toward the film magazine 17, but allows it to be moved aside manually to permit the magazine 17 to be installed axially onto the reader device. As best depicted in FIG. 3, the upper and lower end flanges 37 and 38 of the threading roller 32 are provided with conically tapering, opposed surfaces 39 and 41, which are aligned with and partially received by corresponding upper and lower recesses 42 and 43 in the magazine member 19 when the latter member is installed on the reader device. Thus, spring 36 urges the conical surfaces 39 and 41 of the threading roller 32 into peripheral engagement with respective reel flanges 22 and 23, thereby flexing the corresponding regions of the flanges 22 and 23 toward one another to effect transverse flexure of the outer film convolution. Consequently, when the supply reel 18 is driven in an unwinding direction by drive means represented in FIG. 2 by motor 44 and gear unit 45, the transverse distortion of successive portions of the outermost filmstrip roll convolution causes the leading end of the film to separate and move tangentially away from the film roll. As the end of the moving filmstrip 25 encounters the internal magazine guide surface 24, it slides along that surface 24 until it reaches the magazine film throat 26, whereupon it enters the throat 26 and is thereby fed into the film guide channel 16. If the leading end of the film should fail to separate from the filmstrip roll, however, the roll simply continues to rotate in an unwinding direction.

The auxiliary film threading device to which the invention is specifically directed comprises a vertical shaft 46 rotatably supported in a bushing 47 in support plate 11. A horizontal support arm 48 is attached to shaft 46 immediately above the support plate 11 by means of hub member 49. At the outer end of the support arm 48, a thin arcuate threading member 51 is attached thereto in concentric relation to shaft 46 and in lateral alignment with the lower position of the film roll on the film reel 18. In its inoperative position shown in broken lines in FIG. 1, the threading member 51 is positioned with its free end 52 located rearwardly of the portion of film guide wall member 13 adjacent the magazine film throat 26. In this position, therefore, the threading member 51 is entirely out of engageable relation with the filmstrip 25 during the normal operation of the automatic threading system. A coil spring 53 located along shaft 46 below support plate 11 is engaged at one end with shaft collar 54 and at the opposite end with a pin 55 extending downwardly from the support plate 11. The coil spring 53 serves to bias the shaft 46 in a clockwise direction as viewed from the top in FIG. 1 thereby resiliently maintaining the threading member 51 in its inoperative position defined by the abutment of support arm 48 with stationary stop pin 56.

To employ the auxiliary threading device, support arm 48 is rotated in a counterclockwise direction with shaft 46 so that the threading member 51 passes through opening 57 in guide wall member 13 and through the film throat 26 to bring the free end 52 of the threading member into generally tangential contact with the film roll as shown in FIG. 1. If the threading member 51 is made of metal, a thin flexible plastic film separating tip 58 is preferably attached to its free end to avoid the possibility of scratching the filmstrip 25 engaged thereby. Alternatively, the threading member 51 and the support arm 48 can comprise a one piece element formed of an appropriate plastic material, such as nylon or the like. In any case, however, the free end of the threading member 51 is pointed to separate the leading end of the filmstrip 25 from the rotating roll so that the outer peripheral surface 59 of the threading member 51 directs that end of the filmstrip 25 into the film guide channel 16 as shown in FIG. 1. While FIG. 1 shows the auxiliary threading device engaged with a relatively small roll of film sound onto the reel 18, it should be apparent from the that figure that the arcuate path of movement of the threading member 51 brings its free end into generally tangential engagement with the film roll, regardless of the size of the roll.

Although the threading member 51 obviously can be moved manually to an operative position by means of an appropriate lever or knob attached directly thereto, the present invention also provides means for limiting the force with which the free end of the threading member 51 can be engaged with the film roll; thereby avoiding damage to the filmstrip 25 or to the auxiliary threading device. For this purpose, a tubular member 61 provided with a lateral operating lever 62 is rotatably supported on shaft 46 above the horizontal support arm 48 and is maintained on the shaft 46 by means of a screw 63 threaded into the upper end thereof. A lateral pin 64 extends outwardly from the lower end of the tubular member 61 between spaced abutment pins 65 and 66, which project upwardly from the base plate 11 to limit the rotational movement of the tubular member 61. Spring 67 is coiled about the lower end of the tubular member 61 with leg 68 thereof hooked around lateral pin 64 and with the opposite spring leg 69 engaged with pin 71 on the horizontal support arm 48. Accordingly, the tubular member 61 is rotatably biased in a clockwise direction relative to support arm 48 so that pin 64 is held lightly in contact with abutment pin 66 by the substantially relaxed spring 67 when the threading member 61 and the operating lever are in their respective inoperative positions shown in broken lines in FIG. 1. To operate the auxiliary threading device, the tubular member 61 is rotated in a counterclockwise direction by means of lever 62 to the position shown in solid lines in FIG. 1, in which lateral pin 64 is engaged with abutment pin 65. Consequently, the resilient counterclockwise force imparted to arm 48 by spring 67 overcomes the opposite influence of spring 53 and causes the threading member 51 to move into engagement with the film roll. Spring 67 can be tensioned only to the extent defined by the limited rotational movement of the tubular member 61 however, it will be seen that the force of engagement of the threading member 51 with the film roll is always resiliently limited, regardless of the manual force applied to lever 62.

By locating the threading member 51 in lateral alignment with the lower portion of the filmstrip 25 on reel 18, the auxiliary threading device is adapted to function also in cooperation with a narrower film reel mounted on the reader device with its lower flange member in the same axial position, as described for example in commonly assigned pending U.S. Pat. application Ser. No. 730,523, entitled "Film Threading Apparatus," filed in the name of Elmer O. Wangerin, on May 20, 1968.

Also, it should be recognized that the utility of the device is not limited to film readers or related apparatus employing image-bearing film, but is equally applicable to other devices, such as tape recorders, in which a similar strip of filmlike material is provided on a supply reel.

The invention has been described in considerably detail with reference to a preferred embodiment thereof, but it will be understood that variations and modifications can be effected within the spirit and scope of the invention as described hereinabove and as defined in the appended claims.

I claim:

1. An auxiliary strip-handling apparatus for use in combination with an automatic strip-threading system, said automatic strip-threading apparatus including:

a. means for rotating a takeup member carrying a strip with a leading end wound in a coil thereon and having a pair of guide surfaces;

b. a first guide member having a strip-retaining surface located adjacent to the guide surfaces of the takeup member and extending circumferentially about at least a portion of the coil, and a throat opening for the passage of the strip; and c. guide surface engaging means for flexing successive regions of at least one of the guide surfaces of the takeup member toward the other guide surface as the takeup member is rotated past said guide surface-engaging means in an unwinding direction by said means for rotating, whereby successive increments of the outermost convolution of the strip wound in a coil are squeezed transversely to cause the leading end of the strip, to separate from the coil and to be guided into the throat opening by said first guide member, said auxiliary strip-handling apparatus comprising:

d. a second guide member having a strip-guiding surface; and e. means for supporting said second guide member with respect to the takeup member for movement from 1. an inoperative position in which said second guide member is located remotely from the takeup member and the strip carried thereby to 2. an operative position in which said strip-guiding surface of said second guide member projects through said throat opening and between the guide surfaces of the takeup member to facilitate the movement of the leading end of the strip into said throat opening as the coil is rotated in an unwinding direction by said means for rotating.

2. An auxiliary strip-handling apparatus according to claim 1 in which said second guide member includes an engaging end, and in which said second guide member is disposed in said operative position in a generally tangential relationship with respect to the coil to separate the leading end of the strip from the coil.

3. An auxiliary strip-handling apparatus according to claim 2 in which said engaging end includes means defining a pointed film-engaging tip formed of a relatively soft and flexible material.

4. An auxiliary strip-handling apparatus according to claim 1 in which there is included operating means for moving said means for supporting to locate said second guide member selectively in either of said operative or inoperative positions thereof.

5. An auxiliary strip-handling apparatus according to claim 4 in which said second guide member comprises an arcuate element supported by said means for supporting for arcuate movement therewith about an axis disposed beyond the takeup member at the center of curvature of said arcuate element, whereby said engaging end of said second guide member moves along a corresponding arcuate path extending through said throat opening during movement of said second guide member between said operative and inoperative positions.

6. An auxiliary strip-handling apparatus according to claim 5 in which said operating means includes spring means for resiliently biasing said means for supporting toward said inoperative position thereof.

7. An auxiliary strip-handling apparatus according to claim 6 further including resilient means interconnecting said operating means and said means for supporting to translate the movement of said operating means to said means for supporting.

8. An auxiliary strip-handling apparatus according to claim 6 further including resilient means for translating the movement of said operating means from a first to a second position to said means for supporting to effect the movement of said second guide member from said operative to said inoperative position, and stop means for preventing the movement of said operating means past said second position to thereby limit the force applicable to said second guide member.

9. Apparatus for feeding the leading end of an elongated strip of web material from a convoluted roll of such material, said apparatus comprising:
   a. means for supporting a roll of convoluted strip material for rotation about an axis;
   b. means for rotating a roll supported on said support means in an unwinding direction about the axis;
   c. guide means, located peripherally adjacent said support means and movable between an inoperative position spaced from a supported roll and an operative position proximate the outer convolution of a supported roll, for directing the leading end of the supported roll to a use station; and
   d. means for applying, at a location spaced rearwardly in the direction of unwinding rotation from said guide means, a transverse squeezing force to successive portions of the outer convolution of the supported roll as such successive portions are successively moved past said location so that the leading end of a supported roll is moved to be guided by said guide means, when said guide means is disposed in its operative position and is directed from the supported roll.